United States Patent
Bond et al.

(10) Patent No.: US 9,676,373 B1
(45) Date of Patent: Jun. 13, 2017

(54) DECONTAINMENT AND CONTAINMENT TRAILER AND ROLL-OFF SYSTEM

(71) Applicants: Clint Aaron Bond, Atoka, OK (US); Michael James Cochran, Atoka, OK (US)

(72) Inventors: Clint Aaron Bond, Atoka, OK (US); Michael James Cochran, Atoka, OK (US)

( * ) Notice: Subject to any disclaimer, the term of this patent is extended or adjusted under 35 U.S.C. 154(b) by 23 days.

(21) Appl. No.: 14/533,621

(22) Filed: Nov. 5, 2014

Related U.S. Application Data

(60) Provisional application No. 61/962,653, filed on Nov. 13, 2013, provisional application No. 61/939,350, filed on Feb. 13, 2014.

(51) Int. Cl.
  *B60P 3/14* (2006.01)
  *B60S 3/04* (2006.01)
  *B60P 3/42* (2006.01)

(52) U.S. Cl.
  CPC . *B60S 3/04* (2013.01); *B60P 3/14* (2013.01); *B60P 3/42* (2013.01)

(58) Field of Classification Search
  CPC .. B60P 3/06; B60P 3/064; B60P 3/066; B60P 3/07; B60P 3/14; B60P 3/42; B60P 3/423; B60S 3/04
  See application file for complete search history.

(56) References Cited

U.S. PATENT DOCUMENTS

| | | | | |
|---|---|---|---|---|
| 2,606,786 A | * | 8/1952 | Howard | B60J 5/0498 296/191 |
| 3,308,845 A | * | 3/1967 | Bellas | B60P 3/14 137/234.6 |
| 4,101,158 A | * | 7/1978 | Jones | B60P 3/42 105/363 |
| 4,119,224 A | * | 10/1978 | Moody | B60P 3/07 280/656 |
| 4,943,108 A | * | 7/1990 | Turnbull | B60P 3/42 296/100.07 |
| 4,981,318 A | * | 1/1991 | Doane | B60P 3/14 296/182.1 |
| 5,233,796 A | * | 8/1993 | Mazalewski, Jr. | B24C 9/00 134/84 |
| 5,833,294 A | * | 11/1998 | Williams | B60S 5/00 296/24.32 |
| 6,422,628 B1 | * | 7/2002 | Bortell | B60P 3/34 296/26.13 |
| 2003/0175429 A1 | * | 9/2003 | Molnar | B60P 3/14 427/307 |

(Continued)

FOREIGN PATENT DOCUMENTS

ZA WO 0115824 A1 * 3/2001 ............. B08B 3/022

*Primary Examiner* — Larry E Waggle, Jr.
*Assistant Examiner* — Tyrone V Hall, Jr.
(74) *Attorney, Agent, or Firm* — Martin G. Ozinga; Phillips Murrah PC

(57) ABSTRACT

The present invention comprises a trailer unit and or a roll-off trailer unit that converts when deployed into a washing and decontamination pad and may include a first section and two or more wings that unfold to provide a platform that is capable of having vehicles and other equipment driven and or wheeled into position on the platform and may also provide a containment system that traps wastewater, contaminates and so forth.

5 Claims, 8 Drawing Sheets

(56) References Cited

U.S. PATENT DOCUMENTS

2006/0045691 A1* 3/2006 Schollmeyer ........... B60P 3/066
 414/470
2012/0223510 A1* 9/2012 Silz ........................ B60P 3/066
 280/656

* cited by examiner

DECONTAINMENT AND CONTAINMENT TRAILER AND ROLL-OFF SYSTEM

CROSS-REFERENCE TO RELATED APPLICATIONS

Priority is claimed from provisional patent application U.S. Ser. No. 61/962,653 filed on Nov. 13, 2013 and provisional patent application U.S. Ser. No. 61/939,350 filed on Feb. 13, 2014 and both incorporated by reference herein.

BACKGROUND OF THE INVENTION

1. Field of the Invention

In general, the present invention relates to an apparatus, system and method of decontaminating and or washing vehicles, trailers and large equipment. More particularly, the present invention provides a trailer capable of being towed that converts into a washing station whereby vehicles, trailers and other large equipment can be rolled onto the surface of the washing station when fully deployed and debris and wastewater from the washing process is contained as desired. Another preferred embodiment provides a foldable washing station that may be utilized and adapted for use with a roll-off truck system.

2. Description of the Prior Art

In the oil and gas industry, a major concern facing the industry is the ever growing and constant concern with environmental impact of oil and gas production coupled with the ever increasing need to maximize efficiency and recovery of natural resources associated therewith. Prior art methods that were perfectly acceptable just years ago are now politically and environmentally unfriendly as well as wasteful in hindsight. Whereas it was acceptable to allow by products from well production to be released onto the ground, it is not considered a viable environmentally sound method to date.

It is also known that it is desirable to clean vehicles and equipment that may have been contaminated with hazardous fluids, man-made chemicals, naturally occurring substances like salt, coal and so forth from operations such as oil and gas production, mining and so on. It is further known that such operations often take place in environmentally sensitive areas where it is not desirable for a vehicle that has been contaminated to possibly pollute the environment while traveling to and from the site of the operation. Therefore, it is common that vehicles and other large equipment are often decontaminated on the way out of the site to remove unwanted contaminants. Still furthermore, it is also sometimes desirable to decontaminate vehicles and large equipment before they may enter a site.

More specifically, in industries such as oil refineries, processing plants, oil and gas recovery, construction, pipeline construction, marinas, toxic spill recovery and so on, there are many occasions when dirty equipment needs to be washed or serviced and containment must be provided to prevent environmental damage and fines. Currently, the only portable containments available are rubber liners that are easy to destroy.

It is also known to provide containment systems that are relatively heavy-duty and somewhat portable for the prevention of ground and surface water contamination resulting from the cleaning and decontaminating of oil field equipment and vehicles. These devices are hard to move and generally semi-permanent devices that must be assembled with a lot of man power and heavy construction equipment such as forklifts and dozers.

It is obviously desirable to remove hazardous fluids, chemicals and wash water in a portable, affordable and reusable manner while eliminating ground and surface water contamination. The balance of cost, time and operational efficiency has created a need for a new and improved removal of wastewater and contaminants that result from decontamination and washing in general. The above discussed limitations in the prior art is not exhaustive. Thus, there is a need for an apparatus, method and system that provides a truly portable and heavy-duty cleaning and containment system for utilization in the oil and gas field as well as other applications where it is desirable to decontaminate large objects that maximizes efficiency and is environmentally friendly. The current invention provides an inexpensive, time saving, more reliable apparatus, system and method where the prior art fails.

SUMMARY OF THE INVENTION

In view of the foregoing disadvantages inherent in the known types of decontamination and washing pads now present in the prior art, the present invention provides a new and improved truly mobile pad apparatus, system and method of use, which may be quickly deployed and removed. As such, the general purpose of the present invention, which will be described subsequently in greater detail, is to provide a new and improved truly mobile cleaning, decontamination, and washing station which has all the advantages of the prior art devices and none of the disadvantages.

To attain this, the present invention essentially comprises a trailer that converts when deployed into a washing and decontamination pad. The trailer may comprise a first section and two or more wings that unfold to provide a platform that is capable of having vehicles and other equipment driven and or wheeled into position on the platform. The platform may also provide a containment system that traps wastewater, contaminates and so forth. The containment system may include holding tanks, cleaning filtrations and so forth. The current invention may be utilized in well operations, well production in general, drilling operations, mining operations and decontamination and washing applications not specific to oil and gas production.

The invention is generally designed to capture toxic and nontoxic fluids and solids that occur during washing and service of construction equipment, vehicles, all-terrain vehicles, watercraft and so forth. It is also understood the current invention may be utilized in other applications where it is desirable to remove dirt, contaminants and so forth from vehicles and large equipment and contain same. It may also include collapsible and or removable walls.

Another preferred embodiment provides a foldable washing station that may be utilized and adapted for use with a roll-off truck. It is contemplated that a washing and or decontaminating unit may be configured to generally roll on and off a roll-off truck known in the industry. The unit may have a base with two foldable wings for a closed position for transport and an open position for use. It may also include collapsible and or removable walls.

It is also understood that the current invention and various embodiments therein may be utilized for cleaning, painting, servicing, working on, decontaminating and so forth of vehicles, items, trailers and so forth. The invention may be utilized with helicopters, golf carts, small vehicles, cars and car dealerships, parts, equipment and so forth.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved mobile washing and decontamination apparatus, system and method of using the same, which may be easily and efficiently transported to the desired site, deployed and removed. A hydraulic powered trailer can be delivered by a single semi-truck and driver who can deploy the sides and ramps in minutes without the need for support equipment or personnel It is a further object of the present invention to provide a new and improved mobile washing and decontamination apparatus, system and method of using the same, which is of a durable and reliable construction and may be utilized with multiple applications.

An even further object of the present invention is to provide a new and improved mobile washing and decontamination apparatus, system and method of using the same, which is susceptible to a low cost of manufacture with regard to both materials and labor, and which accordingly is then susceptible to low prices of sale to the consuming industry, thereby making such economically available to those in the field.

Still another object of the present invention is to provide a new and improved mobile washing and decontamination apparatus, system and method of using the same, which provides all of the advantages of the prior art, while simultaneously overcoming some of the disadvantages normally associated therewith.

Another object of the present invention is to provide a new and improved mobile washing and decontamination apparatus, system and method of using the same that is environmentally friendly while practical.

Yet another object of the present invention is to provide a new and improved mobile washing and decontamination apparatus, system and method of using the same that may be trailered by trucks into hard to reach areas and deployed without large equipment such as forklifts.

An even further object of the present invention is to provide a new and improved mobile washing and decontamination apparatus, system and method of using the same and is transportable along existing highways without special provisions.

Still another object of the present invention is to provide a new and improved mobile washing and decontamination apparatus, system and method of using the same to provide an easily moveable, quick deploying mobile containment system that allows total containment for toxic and nontoxic materials that occur during wash and service of heavy equipment, vehicles, and or parts as well as provide a temporary containment or secondary containment to prevent fluid and debris runoff during storage, wash, service, assembly and disassembly of potential contaminated equipment.

It is also an object of the present invention to provide a new and improved mobile washing and decontamination apparatus, system and method of using the same, which may be easily and efficiently transported to the desired site, deployed and removed that may manually be deployed without a power source.

Another object of the present invention is to provide a new and improved mobile washing and decontamination apparatus, system and method of using the same, which may be easily and efficiently transported to the desired site, deployed and removed by use with a roll-off truck.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings and appendices wherein.

DETAILED DESCRIPTION OF THE PREFERRED EMBODIMENTS

Figure 1:
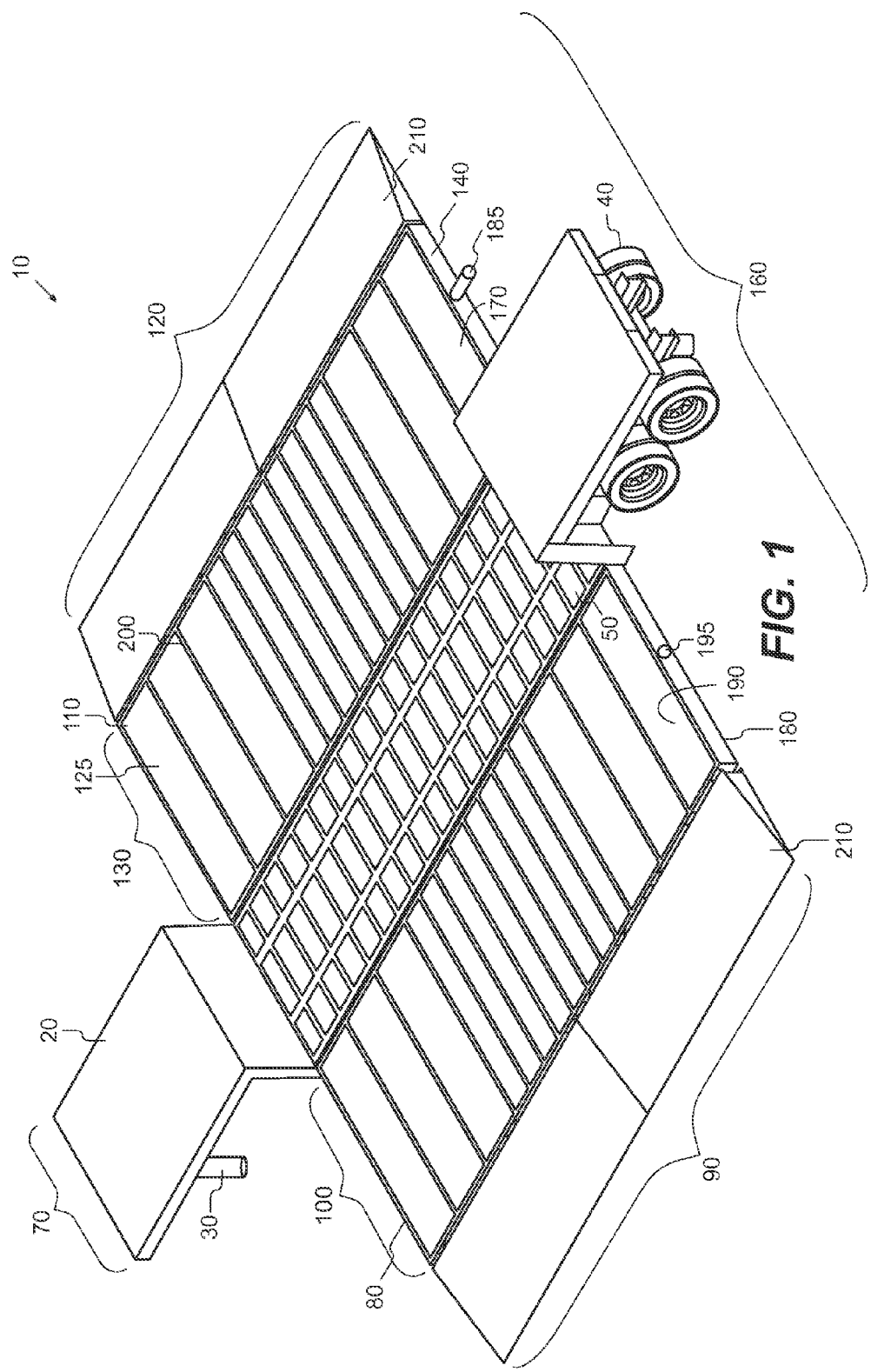
FIG. 1 is a general perspective illustration of a preferred embodiment of the invention with the invention in the deployed and or open configuration.
Figure 2:
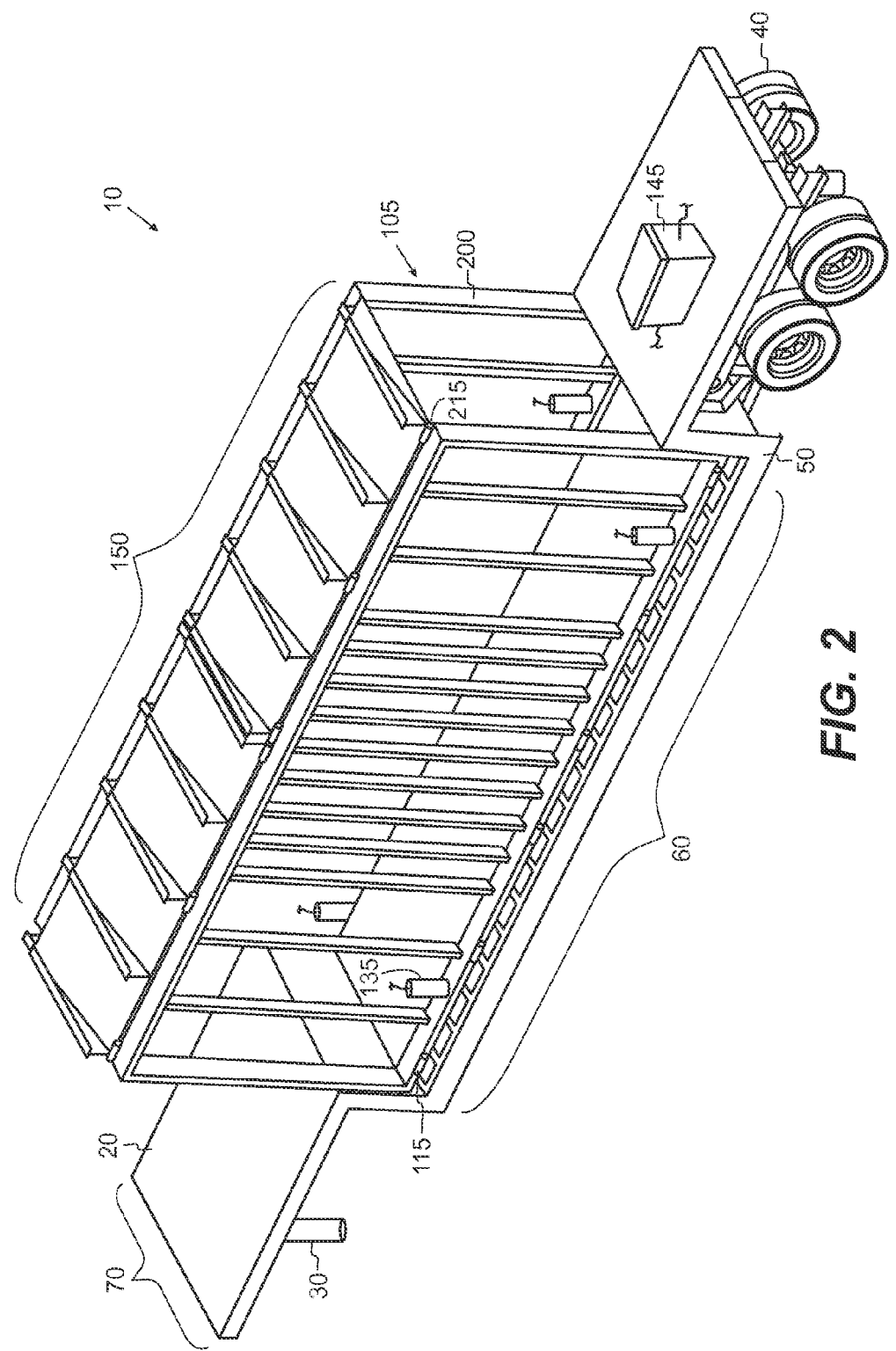
FIG. 2 is a general partial perspective illustration of a preferred embodiment of the invention of FIG. 1 with the invention in the non-deployed and or closed configuration.
Figure 3:
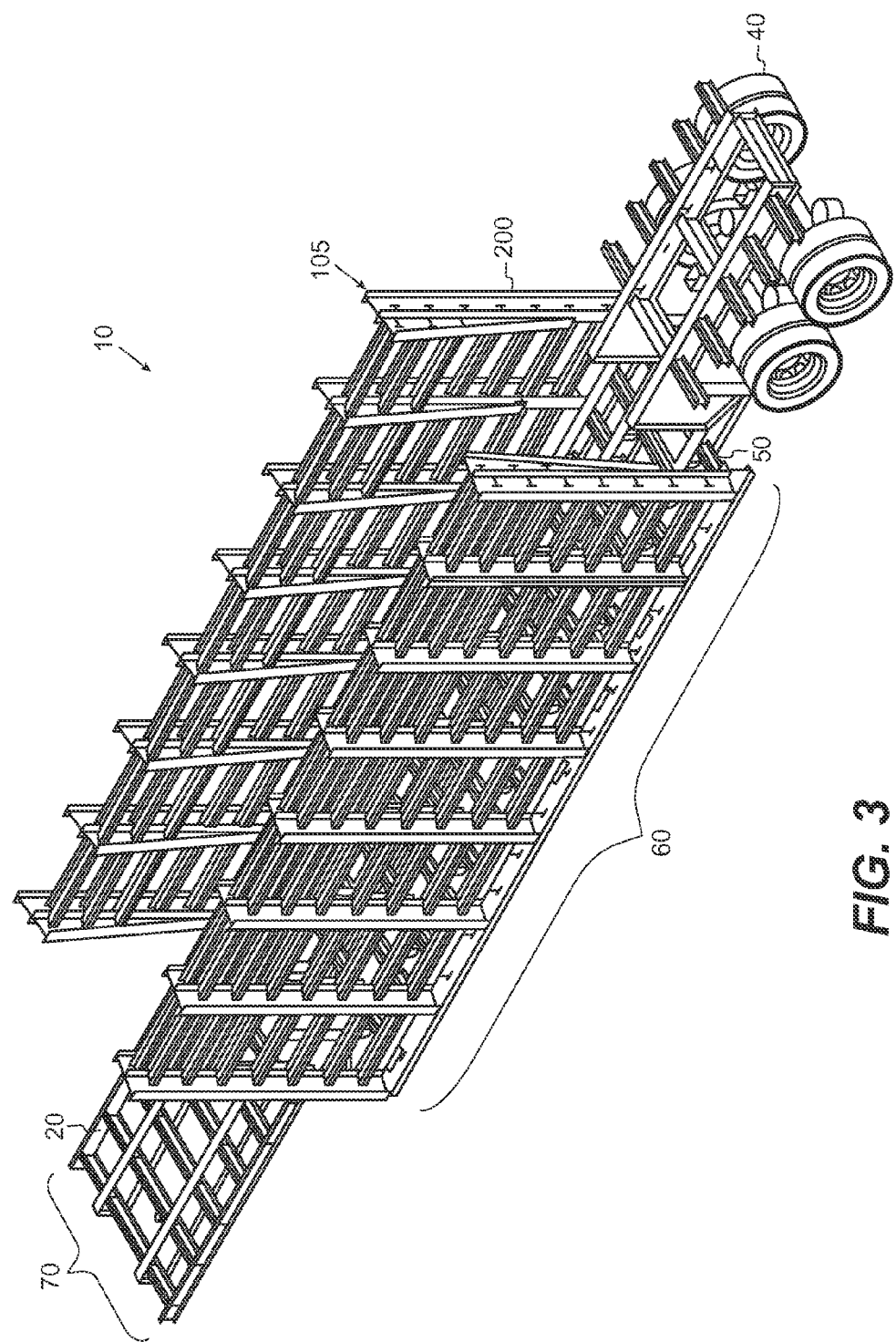
FIG. 3 is another general partial perspective illustration of a preferred embodiment of the invention of FIG. 1 with the invention in the non-deployed and or closed configuration.
Figure 4:
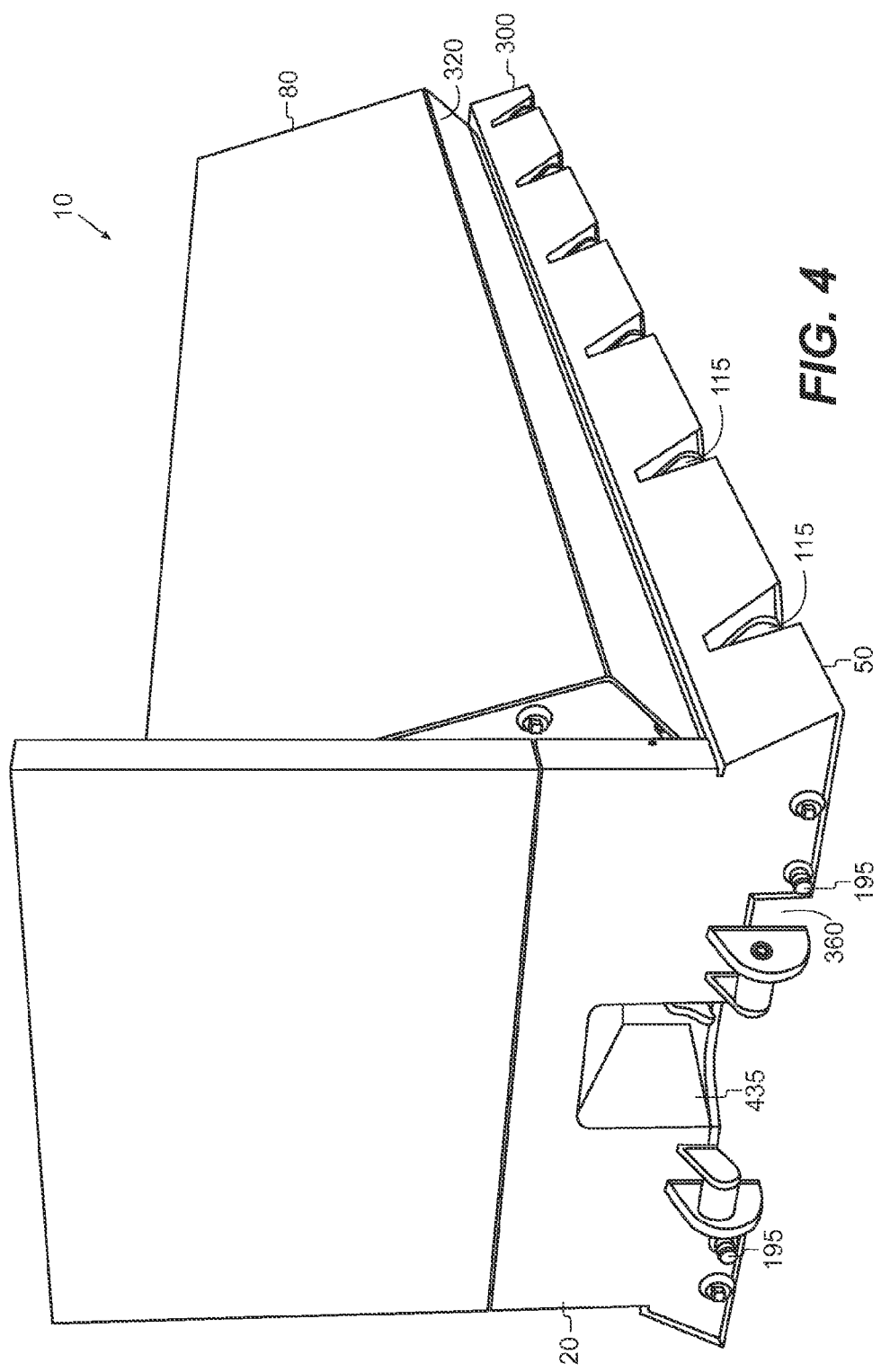
FIG. 4 is a general perspective view illustration of a preferred embodiment of the invention with the invention in the non-deployed and or closed configuration for use with a roll-off truck.
Figure 5:
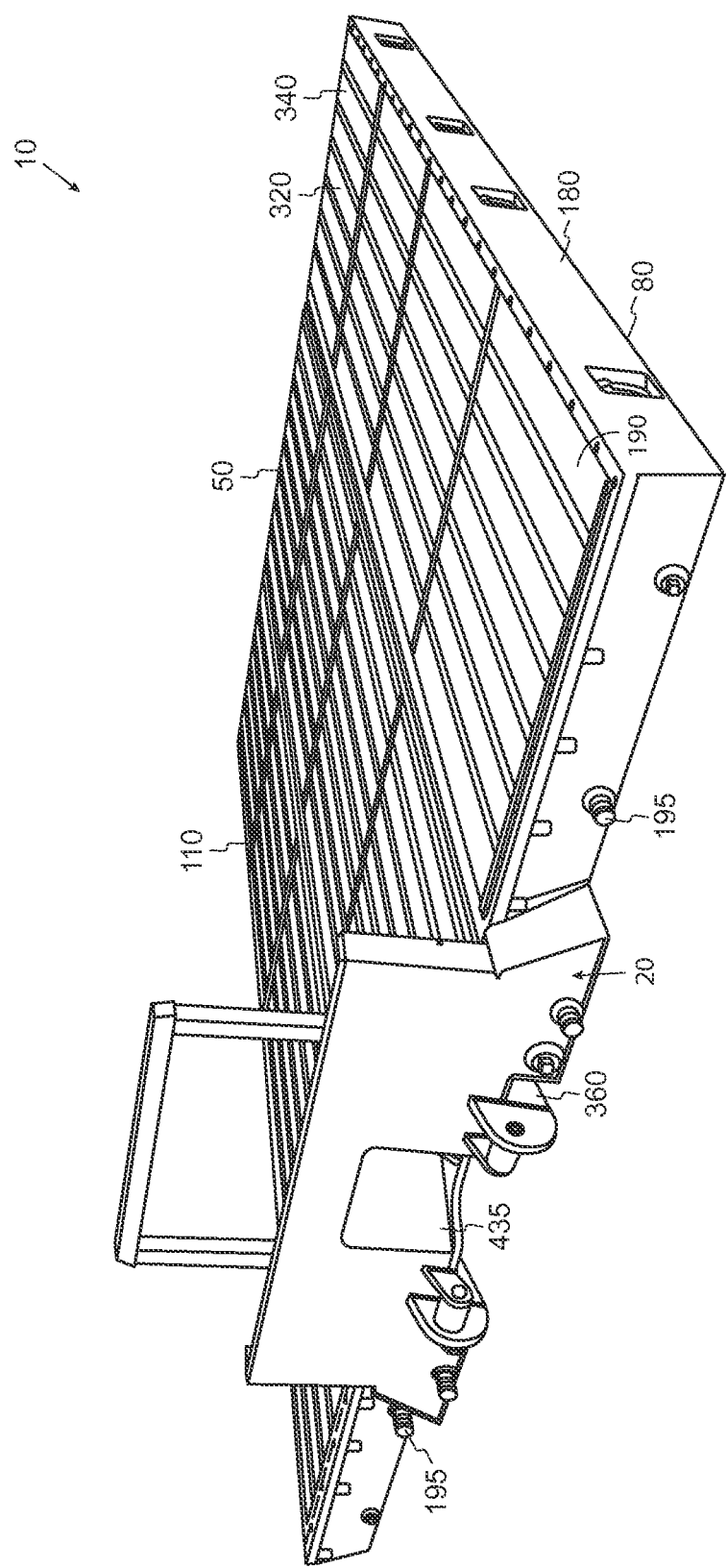
FIG. 5 is a general perspective illustration of a preferred embodiment of the invention of FIG. 4 with the invention in the deployed and or open configuration.

Referring to the illustrations, drawings and pictures and to FIGS. 1, 2 and 3 in particular, reference character 10 generally designates a new and improved apparatus, system and method of using same constructed in accordance with the present invention. Invention 10 is generally used with cleaning and or decontamination of large equipment, vehicles and equipment in general where it is desirable to provide a platform that can capture the water utilized and the associated debris, chemicals and so forth resulting from the cleaning and decontamination process. It is understood that invention 10 may be utilized in numerous other applications where it is desirable to provide a containment system and platform for such operations and the current invention should not be considered limited to just oil and gas applications. Therefore, it is understood that the current invention may be utilized with multiple applications and the current disclosure should not be considered the invention to such.

Generally, invention 10 may comprise semi-trailer and or trailer 20 having hitch 30 and wheel system 40. It is understood that trailer 20 may be of a size and construction for removably attaching to a vehicle (not depicted) for towing as known in the art. It is contemplated that semi-trailer and or trailer 20 may have no front wheels although it is also contemplated that trailer 20 may have wheels and generally be of a one-piece construction that may include a cab and associated engine. Trailer 20 may be of the standard size of 53 feet long although longer and shorter lengths are contemplated. It is also contemplated that wheel system 40 may be removable, trailer 20 may be lowered and raised by a support system, and wheel system 40 may have an independent support system, and combinations thereof.

Invention 10 may further include a first and or center pad section 50 defined by length 60 and width 70, first wing pad section 80 defined by length 90 and width 100, and second wing pad section 110 defined by length 120 and width 130. It is understood that each section may comprise a first side wall, a second side wall, a third side wall, a fourth side wall, and a bottom plate that generally forms a containment tray as discussed further below.

When invention 10 is generally open and or deployed as generally illustrated in FIG. 1, a platform area 140 may be utilized and generally defined by length 150 and width 160. Open position may generally be when center section 50, first wing 80 and or second wing 110 are horizontally positioned.

Platform area 140 may have a top 170 and a bottom 180 wherein the item and or vehicle to be decontaminated may be positioned on said top 170 and the containments, debris, water, and so forth are generally contained by bottom 180.

Center section 50, first wing 80 and second wing 110 may generally define service area and or platform area 140 wherein top 170 may be of a general solid surface with holes, drains, grates and so forth to allow water, contaminants, debris and so forth into containment tray, void area, tank, compartment and or cell(s) 190 generally between top 170 and bottom 180 for general containment. Top 170 may be part and or all screen mesh and or grate. It is also contemplated that top 170 may be of generally solid configuration with side channels and or drains to funnel water, contaminants, debris, and so forth into cell(s) 190, tanks, and combinations thereof. It is understood that top surface may generally be adapted for channeling liquids and debris away from the top surface 170 by other known methods and prior art.

It is to be understood that center section 50, first wing 80 and or second wing 110 may have cell(s) 190 that are independent form each other, may be combined to form one cell 190, and so forth. It is also contemplated that platform area 140 top 170 may be a combination of solid beams, grating and so forth adapted to support a vehicle and or heavy equipment. It is contemplated the debris, water, material and so forth can be transferred around and through the support members 200.

Invention 10 generally contemplates that the cell(s) and or containment tray may generally have a support members 200, support structure, and so forth positioned inside the containment tray and or cell(s) 190 capable of supporting vehicles and equipment to be decontaminated and or cleaned. Top 170 surface with underlying support members 200 may allow for the parking and or placing of objects to be washed or serviced and further allows fluid and materials to transfer to the bottom 180 and of cell(s) 190.

It is contemplated that center section 50, first wing 80 and second wing 110 may have individual cell(s) 190 with tanks with communications between, separate cell(s) 190 and tanks and combinations thereof. Cell(s) 190 may further include drain apertures and or outlet(s) 195. It is contemplated to provide quick disconnect hose(s) 185 for the liquid communication and draining of cell(s) 190. It is still further contemplated to provide removable tubs and or liners in between top 170 and bottom 180 and or integrated with same.

Once again referring to the illustrations in general, and more in particular to FIGS. 2 and 3 in accordance with a preferred embodiment of invention 10, the illustrations depict a closed configuration 105 first wing 80 and second wing 110 may be hingedly and or foldably connected to center section 50 to fold up for transportation and or storage via hinge(s) 115. Closed position is generally when center section 50 is generally horizontal and first wing 80 and or second wing 110 are folded to a generally perpendicular or about perpendicular to center section 50. It is understood that first wing 80 and or second wing 110 may generally fold up for transportation, removed for transportation, and that numerous degrees of folding are contemplated that may be greater and lesser to perpendicular.

Again referring to the illustrations in general, and more in particular to FIG. 1, it is also contemplated that first wing 80 and second wing 110 may be raised and or lowered with hydraulic cylinder(s) 135 powered by a power source 145 such as but not limited to separate gas motor, electric motor, the motor from the towing vehicle, other independent power source, a power source mounted to trailer 20, and combinations thereof in an open configuration 125. It is understood that invention 10 may also generally be manual and not utilize a power source 145 for the deployment and folding process. Furthermore, invention 10 may include power source 145 but also may still be utilized and or function manually without the power source 145.

It is contemplated that first wing 80 and second wing 110 may include ramp(s) 210 for ingress and egress of vehicles and or items to be placed on platform area 140. Ramp(s) 210 may be integrated into and or part of first wing 80 and second wing 110 respectively, removable and combinations thereof. Ramp(s) may be hinged via hinge(s) 215 also. It is also contemplated that first wing 80 and second wing 110 may include extensions that may generally slide out to further extend length 150. It is also contemplated that invention 10 may include one or more trailer(s) 20, which may connect to further extend length 150.

It is further contemplated that invention 10 may have more than two wings and or may have a dual fold such that another or third wing may be hingedly connected to first wing 80 end that is not connected to center section 50 and second wing 110. Further, another or fourth wing may be hingedly attached to second wing 110 end that is not connected to center section 50. This configuration would allow the length 150 to increase even further. It is also understood that invention 10 may just utilize a center section 50 and at least one wing, two wings, and so forth. Furthermore, wings may generally fold onto and or over center section 50 so they lay generally flat when in the closed position, partially flat, perpendicular, about perpendicular and so forth and so forth.

In another preferred embodiment, invention 10 may include an attached and or removable wash water tank, pressure washer, outside removable walls and or curtains and combinations thereof. It is further contemplated to provide a power source that may be integrated, although, it is further contemplated to provide a non-integrated power source.

It is contemplated invention 10 may be transported, set up and removed by a single operator who may also operate the truck utilized with trailer 20. It is contemplated that the steps to deploy may take just minutes. It is also contemplated the steps to position for transport may also take just minutes and once again be accomplished by one operator.

In a preferred embodiment, trailer 20 may be attached to a vehicle such as truck and or tractor (not shown) via hitch 30 and transported with wheel system 40. During transportation, trailer 20 may have first wing 80 and second wing 110 in a general upright position as generally depicted in FIGS. 2 and 3. Once in the desired location and or position, trailer 20 may be removed from truck although it is contemplated that truck may stay attached during deployment. Trailer 20 may be lowered to ground level or left at travel level.

It is contemplated that first wing 80 and second wing 110 may be lowered into position as generally depicted in FIG. 1 by hingedly rotating first wing 80 and second wing 110 from center section 50. Connections may be utilized and or other means to secure the now platform area 140 for accepting vehicles and or other items to be decontaminated.

Once decontamination is finished as desired, containment of debris, water and so forth may be accomplished by draining to separate tanks and or left in the unit to later be removed. First wing 80 and second wing 110 may be raised into a general upright position again as depicted generally by FIGS. 2 and 3, and trailer 20 moved and or transported to a new location as desired.

ANOTHER PREFERRED EMBODIMENT

Once again referring to the illustrations and more in particular to FIGS. 4 through 8, it is also contemplated that invention 10 may include a roll-off decontamination and containment pad system 300 to be generally utilized with a roll-off truck 310 known in the art. First and or center section 50, first wing 80, and second wing 110 may be configured as generally described above and configured and or adapted generally for use with roll-off truck 310 for transportation.

As is generally understood in the relevant art, roll-off truck 310 is employed to transport a container, receptacle and or item from one location to another. As employed herein, the expression "roll-off truck" and variations thereof shall refer broadly to any vehicle having a mechanism that enables the loading thereon, the transport from one location to another and the unloading therefrom of a container, receptacle and or item as discussed further below.

A fold up pad 320 may be generally formed as described but adapted to fold into a closed position 330 for transport and open position 340 for use. Fold up pad 320 may have a number of rollers 350 and have a channel or channel(s) 360 formed in an underside thereof. Rollers 350 and the channel (s) 360 are depicted in some but not all figures for purposes of simplicity.

The schematically depicted roll-off truck 310 includes a plurality of wheels 370 that roll on the ground and further comprises a platform or skids apparatus 380 that is disposed on the wheels 370. The platform apparatus 380 includes a vehicle frame 390 and a loading apparatus 400. More particularly, the vehicle frame 390 is directly connected with the wheels 370, and the loading apparatus 400 is mounted to the vehicle frame 390 as generally depicted although numerous configurations as known in the art are also contemplated. The roll-off truck 310 further includes a cab 410 mounted to the vehicle frame 390.

Invention 10 may include a movable platform 420 that is movably mounted on the vehicle frame 390, a retractable cable 430 which extends from one end of the movable platform 420 and is connectable with the pad 320, and a hydraulic lift cylinder 440 that extends between the vehicle frame 390 and the movable platform 420. The movable platform 420 is pivotably mounted to the vehicle frame 390 at approximately its rear-most region. It is understood, however, that other embodiments of the roll-off truck 310 may have movable platform 420 that is movable in other fashions without departing from the present concept.

It is contemplated that pad 320 may be situated on the ground and loaded onto the roll-off truck 310 by connecting the cable 430 with pad 320 and operating a winch (not expressly depicted herein) or other mechanism to retract the cable 430, whereby pad 320 is pulled onto the movable platform 420. In so doing, the movable platform 420 is received in the channel(s) 360 formed in the underside of pad 320. A hydraulic lift cylinder 440 is collapsed to cause the movable platform 420 with pad 320 situated thereon to pivot downward from its inclined position to a position generally horizontal as is depicted. It is understood that the movable platform 420 may additionally include its own rollers or other structures that are not expressly depicted herein but that are within the scope of the present concept.

It is understood that roll-off truck 310 raises its hydraulically operated bed and the roll-off fold up pad 320 rolls off of the bed of truck 310. Cable 430 is used to slowly lower and or raise the fold up pad 320 via hook 450 and or other removable attachment. It is understood that roll-off attachment system 435 may be known in the prior art.

It is contemplated that roll-off truck 310 may or may not use a winch system. It is contemplated a hook-lift system may be utilized wherein the truck may extend generally a 90 degree arm with a hook on the end which hooks under a bar and gently lifts the unit onto the truck. It is known that most hook-lift and or hitch systems are on smaller roll-off trucks and the invention may be utilized on all types of roll-off trucks.

It is contemplated that pad 320 may be of the standard size of 24 feet long although longer and shorter lengths are contemplated. It is also contemplated that pad 320 and truck 310 may be a standard size known in the industry for highway travel without being classified as an oversized load although both are contemplated. It is also contemplated that pad 320 when in the closed position may generally be water tight for transport and generally self-contained. It is also generally contemplated that invention 10 contains wastewater, contaminates and so forth as desired and may be drained in a controlled fashion as desired to prevent storm drains and other environment spills and contamination issues.

It is also contemplated that rollers 350 may be removable, pad 320 may be lowered and raised by a support system, and supplemental wheel system other than rollers 350 and may have an independent support system and combinations thereof. It is understood that numerous configurations are contemplated.

Figure 6:
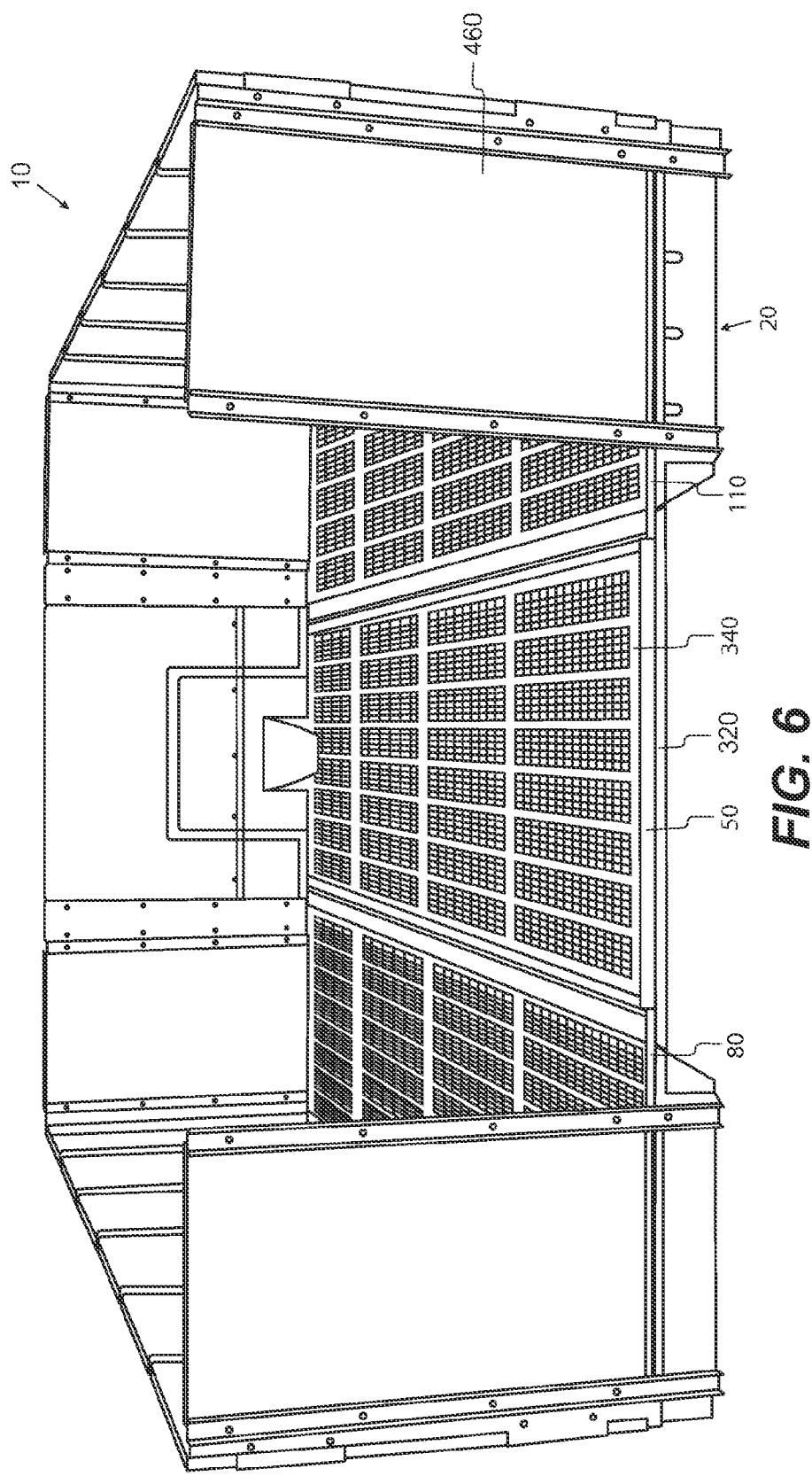
FIG. 6 is a general perspective illustration of a preferred embodiment of the invention of FIG. 4 with the invention in the deployed and or open configuration with removable walls attached.
Figure 7:
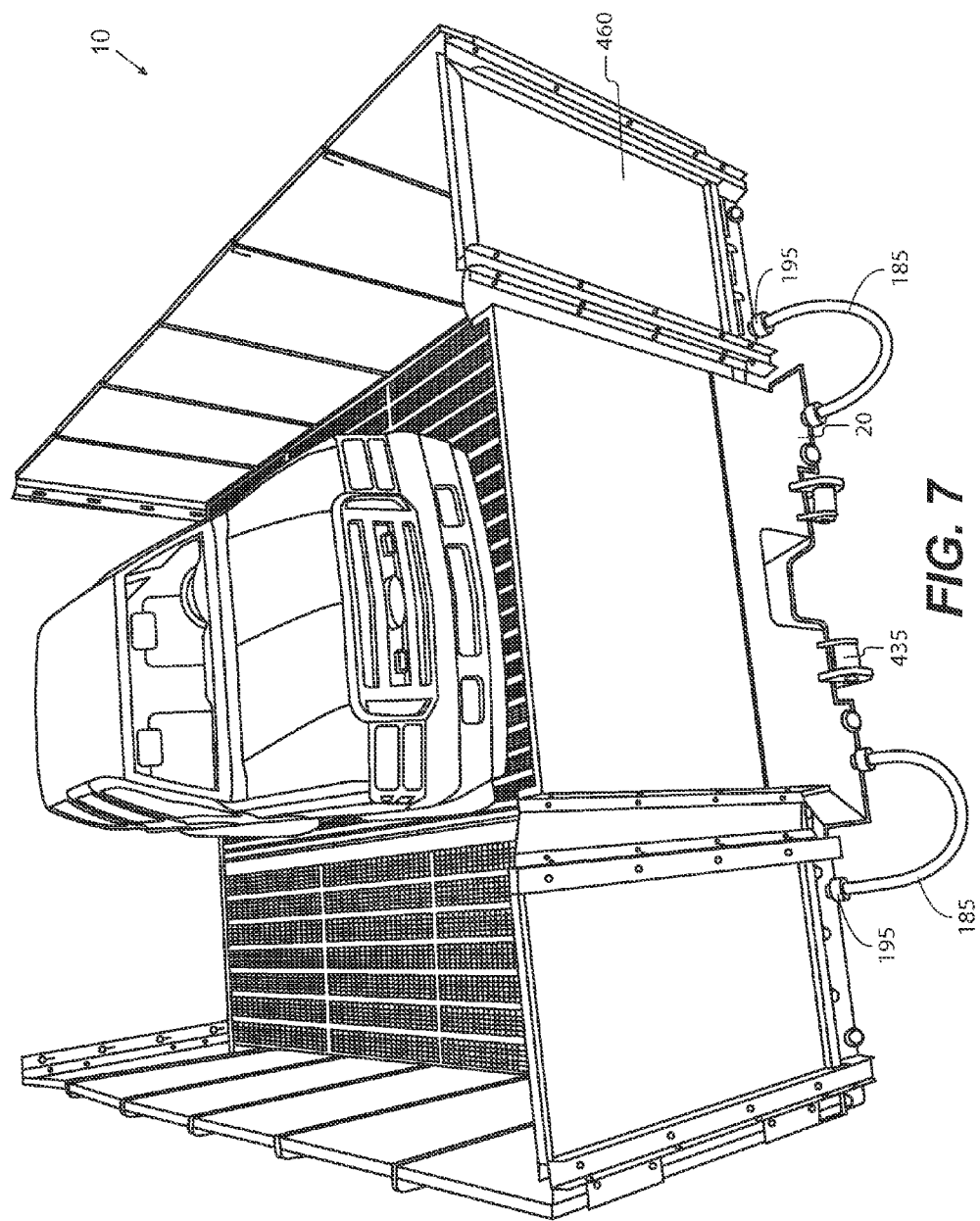
FIG. 7 is a general perspective illustration of a preferred embodiment of the invention of FIG. 4 with the invention in the deployed and or open configuration with removable walls attached and vehicle positioned thereon.
Figure 8:
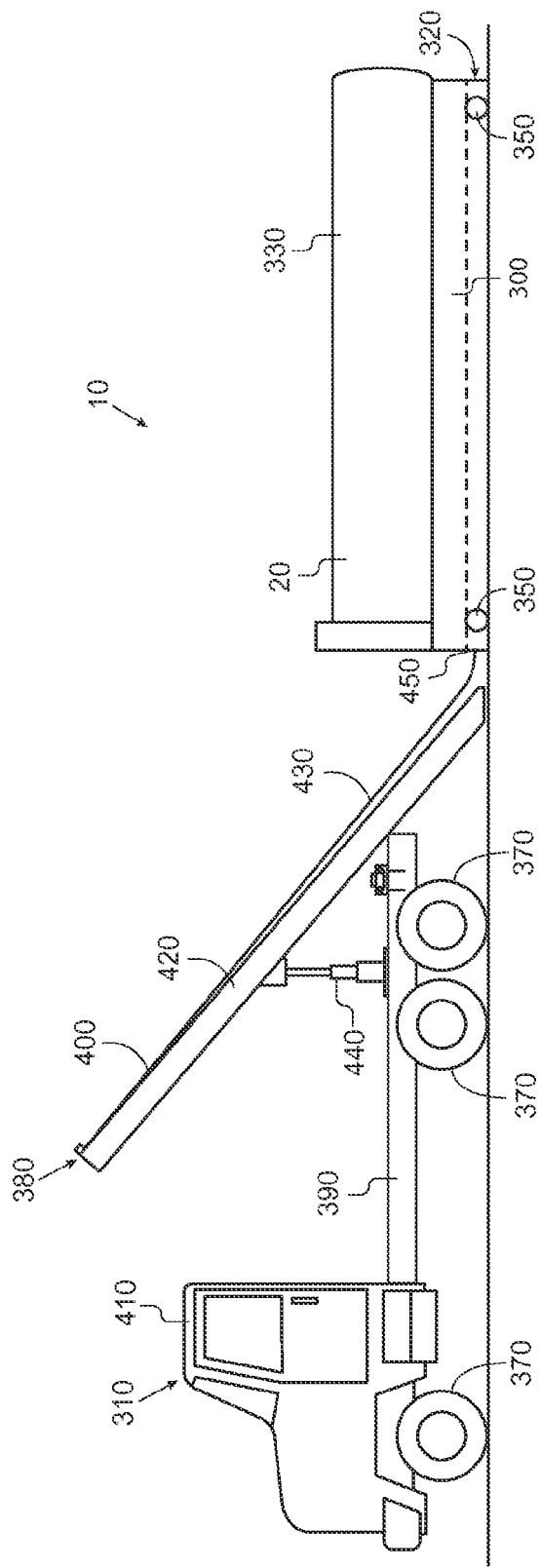
FIG. 8 is a general perspective view illustration of a preferred embodiment of the invention of FIG. 4 with the invention in the non-deployed and or closed configuration and being loaded (or unloaded) from a roll-off truck.

Once again referring to the illustrations and more in particular to FIGS. 6 and 7, in another preferred embodiment, invention 10 may include wall(s) 460 that may be removably attached to center section 50, first wing 80 and second wing 110. Although not depicted, wall(s) 460 may include a door and may further cover the entire perimeter of platform area 140. This may provide a generally secure environment to wash an item such as but not limited to vehicle 470 without worry of spray, contaminants and so forth leaving platform area 140. This may also provide a windbreak. Wall(s) 460 may be removably attachable as known in the prior art and may be transported with trailer 20 and or roll-off system 300.

Invention 10 therefor contemplates a mobile decontamination and containment pad and or system for washing vehicles and equipment comprising a center pad section having a first side wall, a second side wall, a third side wall, a fourth side wall, and a bottom plate, wherein said first side wall, said second side wall, said third side wall, said fourth side wall, and said bottom plate form a containment tray, wherein said containment tray having a support structure positioned inside capable of supporting vehicles and equipment, a grate positioned over said containment tray, and wherein said first side wall is opposite said second side wall; a first wing pad section having a first side wall, a second side wall, a third side wall, a fourth side wall, and a bottom plate, wherein said first side wall, said second side wall, said third side wall, said fourth side wall, and said bottom plate form a containment tray, wherein said containment tray having a support structure positioned inside capable of supporting vehicles and equipment, a grate positioned over said containment tray, and wherein said first wing pad section is hingedly connected to said center pad section said first side wall; a second wing pad section having a first side wall, a second side wall, a third side wall, a fourth side wall, and a bottom plate, wherein said first side wall, said second side wall, said third side wall, said fourth side wall, and said bottom plate form a containment tray, wherein said containment tray having a support structure positioned inside capable of supporting vehicles and equipment, a grate positioned over said containment tray, and wherein said second wing pad section is hingedly connected to said center pad section said second side wall; wherein said center pad section, said first wing pad section, and said second wing pad section form a containment pad when in an open position when said center pad section, said first wing pad section, and said second wing pad section are generally horizontal; and wherein said center pad section, said first wing pad section, and said second wing pad section form a closed position for transporting when said first wing pad section is about perpendicular to said center pad section and said second wing pad section is about perpendicular to said center pad section.

Invention 10 also contemplates that said center pad section, said first wing pad section, and said second wing pad section each have a drain aperture; said center pad section is attached to a hitch and wheels for towing by a truck; wherein said center pad section is adapted to be transported by a roll-off truck and may include a system with a roll-off truck.

Changes may be made in the combinations, operations, and arrangements of the various parts and elements described herein without departing from the spirit and scope of the invention.

What is claimed is:

1. A mobile decontamination and containment pad for washing
   vehicles and equipment comprising:
   a center pad section having a first center pad side wall, a second center pad side wall, a third center pad side wall, a fourth center pad side wall, and a bottom plate, wherein said first center pad side wall, said second center pad side wall, said third center pad side wall, said fourth center pad side wall, and said bottom plate form a center containment tray, wherein:
   said center containment tray having a support structure positioned inside that is capable of supporting vehicles and equipment, a grate positioned over said center containment tray, and wherein said first center pad side wall is opposite said second center pad side wall;
   a first wing pad section having a first first wing pad side wall, a second first wing pad side wall, a third first wing pad side wall, a fourth first wing pad side wall, and a first wing pad bottom plate, wherein said first first wing pad side wall, said second first wing pad side wall, said third first wing pad side wall, said fourth first wing pad side wall, and said first wing pad bottom plate form a first wing containment tray, wherein: said first wing containment tray having a support structure positioned inside capable of supporting vehicles and equipment, a grate positioned over said first wing containment tray, and wherein said first wing pad section is hingedly connected to said center pad section at said first center pad side wall;
   a second wing pad section having a first second wing pad side wall, a second second wing pad side wall, a third second wing pad side wall, a fourth second wing pad side wall, and a second wing pad bottom plate, wherein said first second wing pad side wall, said second second wing pad side wall, said third second wing pad side wall, said fourth second wing pad side wall, and said second wing pad bottom plate form a second wing containment tray, wherein: said second wing containment tray having a support structure positioned inside capable of supporting vehicles and equipment, a grate positioned over said second wing containment tray, and wherein said second wing pad section is hingedly connected to said center pad section at said second center pad side wall;
   wherein said center pad section, said first wing pad section, and said second wing pad section form a containment pad when in an open position when said center pad section, said first wing pad section, and said second wing pad section are generally horizontal; and wherein said center pad section, said first wing pad section, and said second wing pad section form a closed position for transporting when said first wing pad section is about perpendicular to said center pad section and said second wing pad section is about perpendicular to said center pad section.

2. The mobile decontamination and containment pad of claim 1 wherein said center pad section, said first wing pad section, and said second wing pad section each have a drain aperture.

3. The mobile decontamination and containment pad of claim 2 wherein center pad section is attached to a hitch and wheels for towing by a truck.

4. The mobile decontamination and containment pad of claim 2 wherein said center pad section is adapted to be transported by a roll-off truck.

5. A mobile decontamination and containment pad system for washing
vehicles and equipment comprising:
a center pad section having a first center pad side wall, a second center pad side wall, a third center pad side wall, a fourth center pad side wall, and a bottom plate, wherein said first center pad side wall, said second center pad side wall, said third center pad side wall, said fourth center pad side wall, and said bottom plate form a center containment tray, wherein:
said center containment tray having a support structure positioned inside that is capable of supporting vehicles and equipment, a grate positioned over said center containment tray, and wherein said first center pad side wall is opposite said second center pad side wall, and wherein said center pad section is adapted to be transported with a roll-off truck;
a first wing pad section having a first first wing pad side wall, a second first wing pad side wall, a third first wing pad side wall, a fourth first wing pad side wall, and a first wing pad bottom plate, wherein said first first wing pad side wall, said second first wing pad side wall, said third first wing pad side wall, said fourth first wing pad side wall, and said first wing pad bottom plate form a first wing containment tray, wherein: said first wing containment tray having a support structure positioned inside capable of supporting vehicles and equipment, a grate positioned over said first wing containment tray, and wherein said first wing pad section is hingedly connected to said center pad section at said first center pad side wall;
a second wing pad section having a first second wing pad side wall, a second second wing pad side wall, a third second wing pad side wall, a fourth second wing pad side wall, and a second wing pad bottom plate, wherein said first second wing pad side wall, said second second wing pad side wall, said third second wing pad side wall, said fourth second wing pad side wall, and said second wing pad bottom plate form a second wing containment tray, wherein: said second wing containment tray having a support structure positioned inside capable of supporting vehicles and equipment, a grate positioned over said second wing containment tray, and wherein said second wing pad section is hingedly connected to said center pad section at said second center pad side wall; wherein said center pad section, said first wing pad section, and said second wing pad section form a containment pad when in an open position when said center pad section, said first wing pad section, and said second wing pad section are generally horizontal; and
wherein said center pad section, said first wing pad section, and said second wing pad section form a closed position for transporting when said first wing pad section is about perpendicular to said center pad section and said second wing pad section is about perpendicular to said center pad section; and a roll-off truck.

\* \* \* \* \*